United States Patent [19]

Smith et al.

[11] Patent Number: 5,048,501
[45] Date of Patent: Sep. 17, 1991

[54] FUEL ECONOMY SYSTEM FOR INTERNAL COMBUSTION ENGINES

[76] Inventors: Dale T. Smith, 604 Clarendon Ct., Troy, Ohio 45373; C. George Amistadi, R.D. #1, Box 445, Dover, Ohio 44622

[21] Appl. No.: 329,192

[22] Filed: Mar. 27, 1989

[51] Int. Cl.$^5$ .................................... F02M 31/00
[52] U.S. Cl. .................... 123/554; 123/555; 123/557; 123/545
[58] Field of Search ............... 123/555, 554, 545, 543, 123/557

[56] References Cited

U.S. PATENT DOCUMENTS

| | | | |
|---|---|---|---|
| 3,963,013 | 6/1976 | Authement et al. | 123/555 |
| 4,174,691 | 11/1979 | Trexler | 123/555 |
| 4,257,366 | 3/1981 | Strem et al. | 123/554 |
| 4,350,134 | 9/1982 | Sparks | 123/555 |
| 4,458,653 | 7/1984 | Geddes et al. | 123/554 |

Primary Examiner—Andrew M. Dolinar
Assistant Examiner—M. Macy

[57] ABSTRACT

A mechanical process for significantly improving the octane rating performance of gasoline powered engines (either conventional carburetion or fuel injection). An auxiliary system fractionates a precise portion of the required fuel and combines the fraction thus formed with a conventionally produced air/fuel mixture in states and proportions which optimize the combustion process. Different means of implementing the process are described utilizing an additional fuel controller which is connected to a fuel supply through an existing fuel pump which delivers fuel to both the fuel controller and an existing carburetion of fuel-injection system. Air for both is drawn through a common air filter. A proportioning system determines the proper amount of air and fuel entering the controller where they are mixed. The vapor fraction is enhanced and stabilized by passing the mixture through a heat exchanger. This vapor-rich mixture is then combined with the air/fuel mixture supplied by the existing system, and introduced into the engine's manifold. Precise control of the vapor fraction permits highly efficient combustion heretofore attainable only with chemical additives, such as tetraethyl lead.

6 Claims, 3 Drawing Sheets

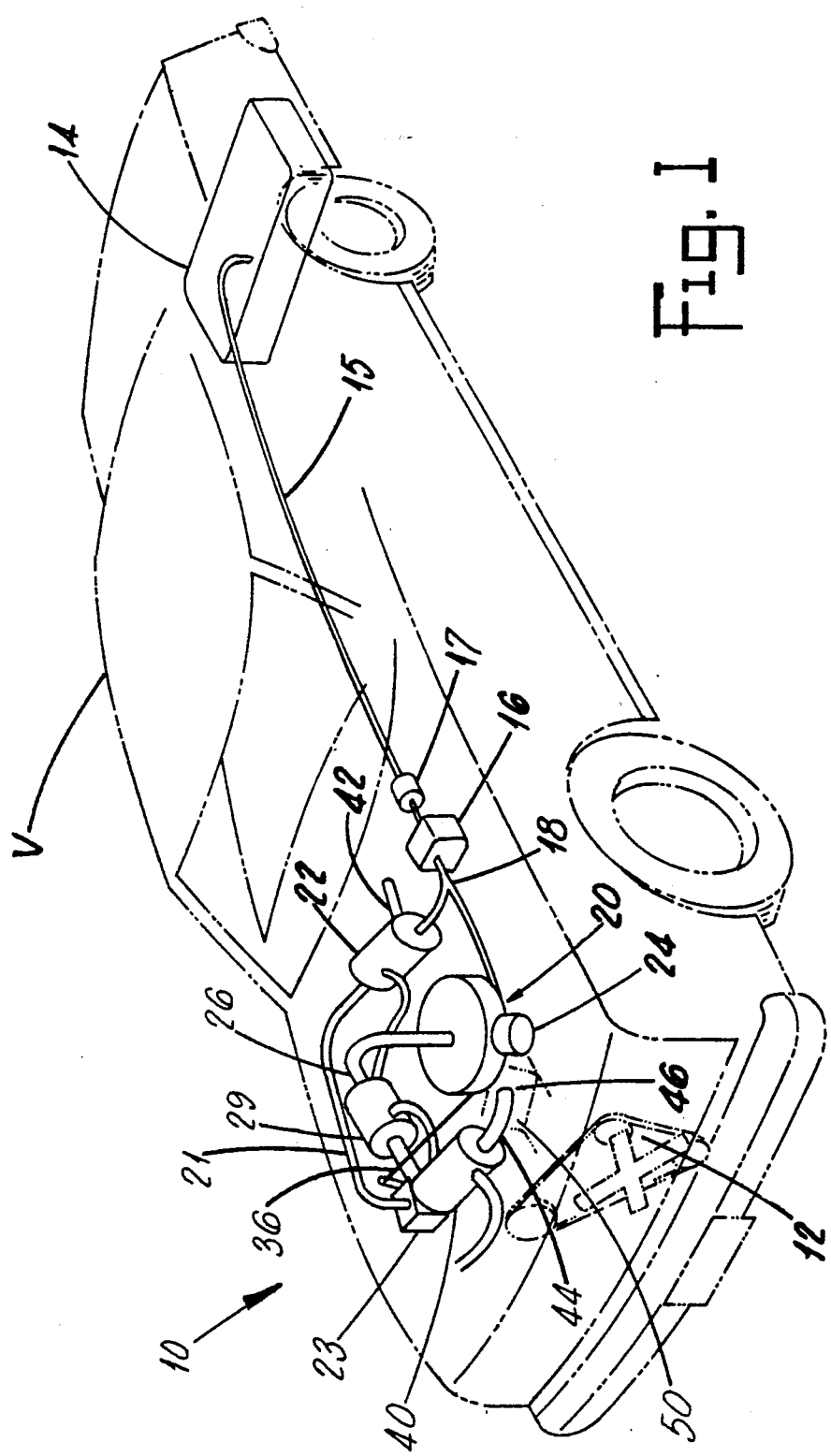

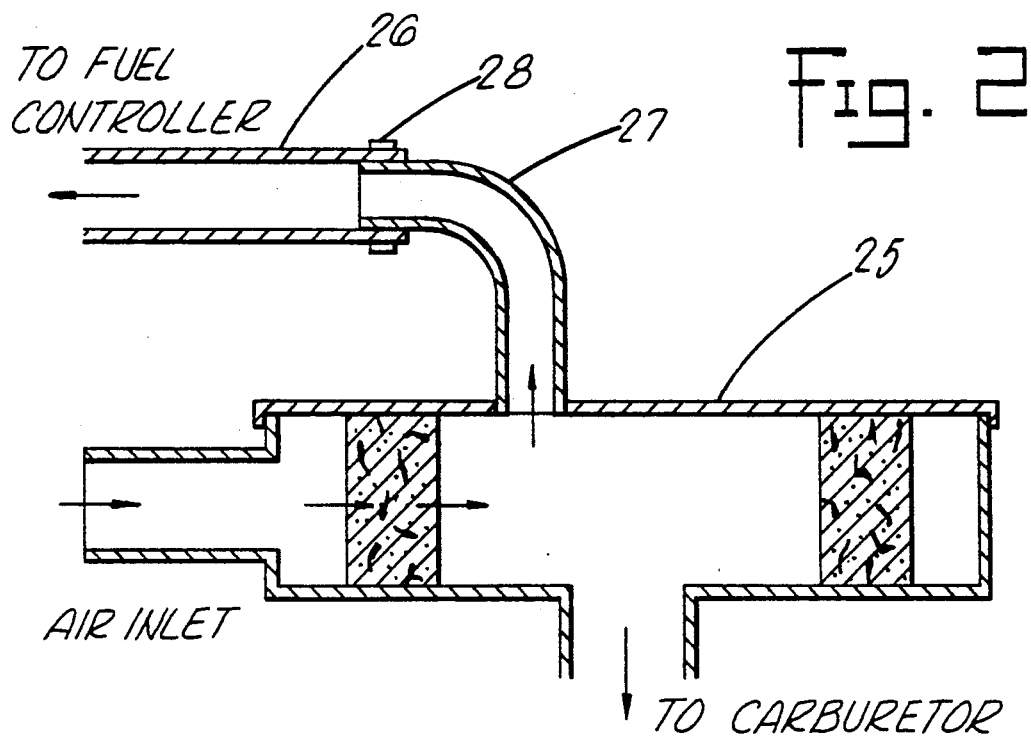
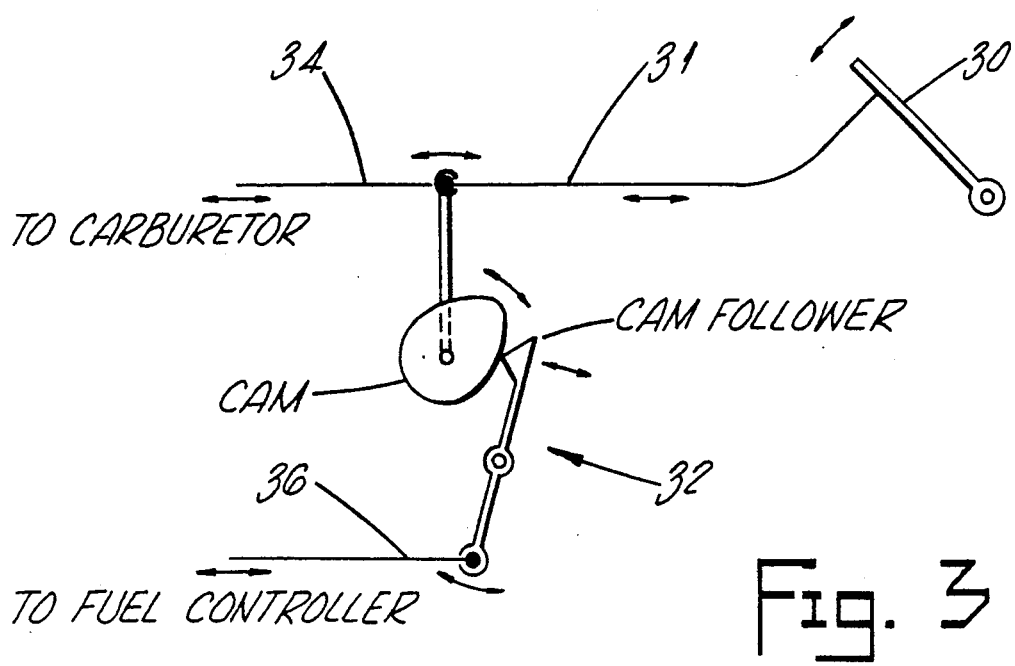

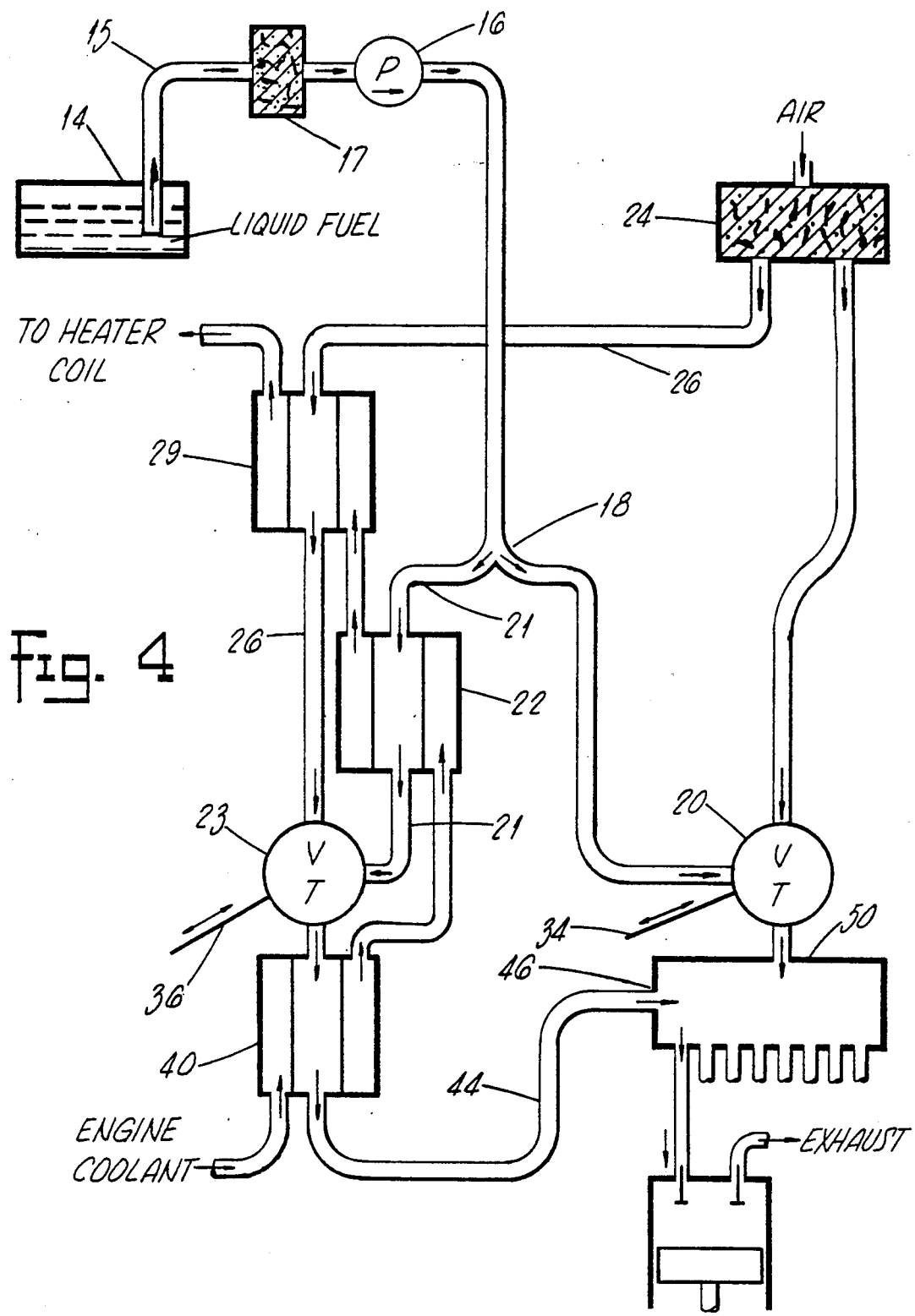

FUEL ECONOMY SYSTEM FOR INTERNAL COMBUSTION ENGINES

FIELD OF THE INVENTION

This invention relates to a combustion efficiency process, and systems implementing it, which supply a precise mixture of fuel and air in the vapor and aerosol states to the combustion chambers of an internal combustion engine.

BACKGROUND OF THE INVENTION

Due to the finite amount of available petroleum resources on the earth, and given the fact that motor vehicles, dependent upon these resources as a source of fuel, notably gasoline, are a major mode of transportation, it is not without reason that much prior art has been devoted to efforts to reduce the amount of fuel required to cover a given distance. In the use of said fuel with an internal combustion engine, it is widely understood that a certain portion of fuel is not burned completely during the combustion process. Additionally, efforts to economize fuel efficiency, have often reduced engine performance, (that is, a reduction in available engine horsepower). Whereas, prior art has attempted to reduce engine exhaust emissions, it usually reduces engine efficiency as well. The approaches taken by prior art are varied and often produce inconsistant results once outside the controlled conditions of the laboratory.

Prior art has attempted to increase fuel economy by using gasoline fumes mixed with various additives or fumes alone. However, such efforts have not produced results as claimed in that after drawing off the fumes of gasoline, the operator has a petroleum by-product remaining in the fuel tank. Removal of said by-product is inconvenient and presents problems as to its disposal. Usually, the results of prior art of this nature are that fuel economy is increased insignificantly or not at all.

Some of the efforts of prior art to improve combustion efficiency are disclosed in the patented art. As exemplified in U.S. Pat. No. 4,177,779, a fuel economy system is disclosed in which engine vacuum is used to draw gasoline fumes and air from the fuel tank with the tank itself being heated by engine coolant. Another example of prior art is U.S. Pat. No. 3,696,799, in which gasoline fumes which normally escape the fuel tank are fed to the carburetor to increase fuel economy. Another example, is U.S. Pat. No. 3,630,698, engine vacuum is used to vaporize gasoline in a container, said fuel is then injected in the combustion chamber along with air.

Many other attempts have been made in prior art to utilize gasoline fumes in various manners, namely as disclosed in U.S. Pat. Nos. 474,838; 1,938,497; 3,749,376; 4,011,847; 4,191,153; and 4,197,820.

Prior art also provides for the use of heated combustion air. As exemplified by U.S. Pat. No. 4,083,343, heated air is introduced to the fuel/air mixture created by the carburetor. Additionally, prior art as disclosed in U.S. Pat. No. 3,116,988, atomized gasoline and small amount of air are heated where fuel is vaporized. Said heated mixture is delivered to the engine manifold. And finally, U.S. Pat. No. 4,386,593, fumes are drawn off an air-tight fuel tank and combustion air is heated, air and fuel are mixed in the combustion chambers.

The above mentioned prior art represents only a small portion of efforts to increase fuel economy. The achievements of prior art has apparently fallen short of expectations in light of the fact that many inventions continue to be advanced.

SUMMARY OF THE INVENTION

This invention provides an auxiliary fuel/air system used in conjunction with conventional carbureted fuel/air mixtures for gasoline-powered internal combustion engines that affords significantly higher fuel economies with substantial gains in performance. In testing the system of invention, gas mileage has been improved by as much as 100% in vehicles ranging from small autombiles, pick-up trucks to large recreational vehicles. Although the system of invention can be adapted to new car production, it was principally designed to be retrofitted on existing gasoline-powered internal combustion engines of all types and sizes. It is significant that the invention is more easy and less costly to install in existing engines than prior art.

The system of invention is an arrangement for delivering an auxiliary vaporized fuel/air mixture to the manifold to be combined with a fuel/air mixture produced by the existing engine carburetor. These combined mixtures are supplied to the combustion chambers by conventional method. The amount of vaporized fuel/air mixture is precisely controlled by either directly or proportionally linking the fuel controller to the existing carburetor which is actuated by the accelerator pedal. The fuel controller mixes air with fuel in a similar fashion as a carburetor. The fuel/air mixture created by the fuel controller is converted to a vaporized state and stabilized by passing the mixture through a heat exchanger which allows the system of invention to be used in all climates. The vapor mixture is supplied to the manifold by passing through a port which leads to the manifold compartment, which has been mechanically altered for this purpose.

It is noteworthy that the preferred embodiment of the invention actually will reduce exhaust emissions. Since the combined fuel/air mixture burns more completely, exhaust waste product is reduced. This, however, should be considered as a natural by-product of this invention as well as prior art in that this a normal effect of fuel economy.

BRIEF DESCRIPTION OF THE DRAWINGS

FIG. 1 is a diagrammatic perspective view of a conventional passenger-type motor vehicle with the fuel system of the present invention disposed in the engine compartment. (Although an 8 cylinder engine is displayed, the preferred embodiment of invention is applicable to all types of gasoline-powered engines).

FIG. 2 is a cross sectional elevation view of the air filter depicted in FIG. 1.

FIG. 3 is a partial side elevation view showing the mechanical linkage between the carburetor and the fuel controller as depicted in FIG. 1.

FIG. 4 is a schematic view of the system of invention depicted in FIG. 1

DETAILED DESCRIPTION OF A PREFERRED EMBODIMENT

The preferred embodiment of the auxiliary fuel/air vaporization system of the present invention is generally denoted as 10 depicted in FIG. 1. The system 10 is shown in use with a conventional internal combustion engine 12. As previously stated, engine 12 is illustrated as an eight cylinder, V configuration engine. The present invention can be used on gasoline-powered engines of all configurations, number of cylinders and displacements, whether conventionally carbureted or fuel injected. Further, it is envisioned that the system of invention 10 can be adapted to a variety of uses (e.g. small trucks, off-road vehicles, recreational vehicles, etc.).

Illustrated in FIG. 1, is a typical automotive vehicle V equipped with an internal combustion engine 12 designed to burn liquid ignitible fuel (gasoline) supplied by a conventional fuel tank 14. The preferred embodiment of invention 10 is designed to be installed as an auxiliary system to boost fuel economy and power.

To obtain an auxiliary fuel mixture, the liquid fuel is preheated, and is reduced to mixed aerosol/vapor states and combined with combustion air in the fuel controller 23 in a manner similar to a conventional carburetor.

To accomplish this, fuel is pumped in a liquid state from the fuel tank 14 by the existing fuel pump 16 via the vehicle's existing fuel line 15 and through the existing in-line fuel filter 17. The outlet from the fuel pump 16 is broken and herein is installed a branch wye 18 to divide the fuel flow between the existing carburetor 20 and the fuel controller 23. The liquid fuel is passed thru a fuel heater 22 to raise its temperature to a precise setting. (As shown in FIG. 4, this fuel heater is illustrated as a separate functional unit. However, in reduction to practice, it may be combined with the fuel/air heater 40.) The preheated fuel is supplied to the fuel controller 23 via fuel line 21.

In the preferred embodiment of invention, combustion air, used by the fuel controller 23, is drawn from a modified air filter arrangement 24, as illustrated in FIG. 2. Filtered air is supplied to the fuel controller 23 by an auxiliary air hose 26. In reduction to practice, the air filter arrangement 24 is modified by drilling a hole in its top cover plate 25. An elbow 27 is inserted through this hole and fastened to the top cover plate 25 in a manner which produces an air-tight seal around the joint. The auxiliary air hose 26 is connected to the elbow 27 and the fuel controller 23 by hose clamps 28. The air hose 26 is actually two pieces, whereby the air heater 29 is positioned. Heat is added by means of a heat exchange process with engine coolant suppling the necessary heat requirement.

To meter the flows of air and fuel in proportion to the existing carburetor 20, the fuel controller 23 is mechanically linked to throttle pedal 30 via a conventional throttle link cable assembly 31 through the link proportioner 32 by an auxiliary throttle link cable assembly 36. As illustrated in FIG. 3, the link proportioner 32 transfers the mechanical signal received from the vehicle's throttle pedal 30 to the carburetor 20 and to the fuel controller 23. The link proportioner 32 sends a throttle signal to the fuel controller 23, which is designed to precisely meter the flows of preheated fuel and preheated air specifically tailored to the host engine performance specification.

As aforementioned, preheated combustion air and preheated liquid fuel are mixed by the fuel controller 23. The vapor fraction is enhanced and stabilized by passing the mixture through a fuel/air heater 40. The fuel/air heater 40 serves to stabilize the temperature of the fuel/air mixture so that the system of the invention is unaffected by various ambient temperatures and humidities. In the preferred embodiment, the fuel controller 23 and the fuel/air heater 40 are mechanically fastened together as to form one mechancial component, even though it serves two functions. In reduction to practice, heat is supplied to the fuel/air heater 40 from the engine's coolant system. The heater hose 34 which normally supplies the vehicle V heater with heated coolant is parted and connected to the fuel/air heater 40 so that the coolant must pass through the fuel/air heater 40, then is connected to the fuel heater 22, and finally connected to the air heater 29 prior to flowing to the heater. The heater hose 34 is fastened to the fuel/air heater 40 by using hose clamps 28.

The vapor rich fuel/air mixture is conveyed to the engine 10 via a fuel/air hose 36. The most economical means to introduce this mixture to the engine 10 is to enter through a mechanically altered port 46 leading to to the manifold 50 compartment. The auxiliary heated vapor rich mixture is directed to manifold 50 where it is combined with the conventional fuel/air mixture supplied by the carburetor 20. These mixtures are conveyed through conventional means to the engine combustion cylinders for ignition.

The preferred embodiment is to introduce the auxiliary vapor rich fuel/air mixture through the mechanically altered port 46. However, if on certain models of motor vehicles, this practice does not prove economically or mechaniaclly feasible, a sandwich plate may be inserted between the carburetor 20 and manifold 50 so that it functions essentially as the preferred embodiment of the invention.

Additionally, the preferred embodiment will perform on fuel-injected engines. In reduction to practice, the system of invention has boosted fuel economies and engine performance in these types of engines.

Having described in word and illustration an exemplary embodiment of the system of invention, it can be seen that the invention provides a novel approach for internal combustion engines. Whereby using an auxiliary vapor rich fuel/air mixture combined with conventional fuel/air mixture to boost fuel economy without sacrificing engine performance is not an obvious extension of prior art.

Further, the simplicity of the invention is enhanced in that it will be understood by those with ordinary skill of the art that they may effect these and other modifications within the scope of the invention.

The following is a summary of the nomeclature used in the preceding abstract.

ITEM DESCRIPTION

V: Typical Automotive Vehicle
10: System of Invention
12: Internal Combustion Engine
14: Conventional Fuel Tank
15: Fuel Line (tank to pump)
16: Fuel Pump
17: In-line Fuel Filter
18: Branch Wye
20: Conventional Carburetor
21: Fuel Line (wye to fuel controller)
22: Fuel Heater
23: Fuel Controller
24: Air Filter Arrangement
25: Top Cover Plate (air filter)
26: Air Hose (air filter to fuel controller)
27: Elbow (on air filter)
28: Hose Clamps
29: Air Heater
30: Throttle Pedal (existing)
31: Throttle Linkage (existing)
32: Linkage Proportioner 34: Throttle Linkage (from 40 to 20)
36: Auxiliary Throttle Linkage
40: Fuel/Air Heater
42: Heater Hose (to heater core)
44: Fuel/Air Hose (heat exc. to engine)
46: Port to Manifold
50: Conventional Manifold I/We claim:

1. A supplemental (add-on) air and fuel vaporization process and apparatus, for an internal combustion engine comprising, means for mixing air and supplemental fuel, and, supplying said mixture to a chamber that is a heat exchanger that is at least one of internally and externally heated, effecting vaporization of a portion of the supplemental fuel in said heated chamber, and combining the heated, partly vaporized fuel and air mixture with at least one of the conventional air of a fuel injected engine and air and fuel mixture, and supplying the total mixture to the combustion chambers for ignition.

2. The process according to claim 1 wherein the quantities of supplemental fuel and air are controlled by the conventional fuel control system.

3. An apparatus according to claim 2 for controlling the supplemental fuel comprising a mechanical linkage, sliding assemblies with the conventional carburetor such that signals received by the carburetor are directly transferred to the supplemental fuel controller.

4. An apparatus according to claim 1 wherein supplemental air is drawn from the altered, conventional air filter system such that the supplemental air is withdrawn from inside the filter.

5. The process according to claim 1 wherein the heat for the heat exchanger is provided by gas from the exhaust manifold.

6. The process according to claim 1 wherein the heat for the heat exchanger is provided by the liquid heating system for the engine.

* * * * *